US008244942B2

(12) United States Patent
Dean et al.

(10) Patent No.: US 8,244,942 B2
(45) Date of Patent: Aug. 14, 2012

(54) COMPUTER STORAGE DEVICE ADAPTER FOR INSTALLING A STORAGE DEVICE IN A COMPUTER DRIVE BAY

(75) Inventors: Ronald P. Dean, Fort Collins, CO (US); Tom J. Searby, Eaton, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 127 days.

(21) Appl. No.: 12/537,014

(22) Filed: Aug. 6, 2009

(65) Prior Publication Data

US 2011/0035519 A1     Feb. 10, 2011

(51) Int. Cl.
G06F 13/12     (2006.01)
G06F 1/16     (2006.01)
H02B 1/00     (2006.01)
H05K 7/00     (2006.01)

(52) U.S. Cl. .............. 710/74; 710/62; 710/72; 361/600; 361/679.02; 361/679.33

(58) Field of Classification Search .................. 710/62, 710/72, 74; 361/600, 679.02, 679.33
See application file for complete search history.

(56) References Cited

U.S. PATENT DOCUMENTS

| | | | | |
|---|---|---|---|---|
| 5,513,068 A | * | 4/1996 | Girard | 361/679.37 |
| 5,524,104 A | * | 6/1996 | Iwata et al. | 720/652 |
| 5,676,718 A | | 10/1997 | Davison et al. | |
| 5,724,227 A | * | 3/1998 | Hancock et al. | 361/679.32 |
| 5,730,515 A | * | 3/1998 | Ho | 312/350 |
| 5,748,442 A | * | 5/1998 | Toor | 361/679.31 |
| 5,921,644 A | * | 7/1999 | Brunel et al. | 312/223.2 |
| 6,049,452 A | * | 4/2000 | You et al. | 361/679.37 |
| 6,075,694 A | * | 6/2000 | Mills et al. | 361/679.02 |
| 6,130,822 A | * | 10/2000 | Della Fiora et al. | 361/724 |
| 6,621,695 B1 | * | 9/2003 | Chen et al. | 361/679.6 |
| 6,910,217 B2 | * | 6/2005 | Kan-o | 720/646 |
| 6,967,832 B2 | | 11/2005 | Mariano | |
| 7,827,568 B1 | * | 11/2010 | Banko | 720/619 |
| 2002/0109966 A1 | * | 8/2002 | Crowley | 361/683 |
| 2006/0087809 A1 | | 4/2006 | Ng | |
| 2006/0245157 A1 | * | 11/2006 | Aaron et al. | 361/685 |
| 2007/0235305 A1 | * | 10/2007 | Chen | 200/296 |
| 2009/0320053 A1 | * | 12/2009 | Izumiya et al. | 720/601 |

OTHER PUBLICATIONS

Thinkpad DVD Ultrabay Slim Burner User's Guide, May 2007, pp. "Front Cover" to p. 12.*
Thinkpad 2nd HDD Adapter for Ultrabay Slim, Jan. 2003, pp. "Front Cover" to p. 1-3.*
PDF of http://www.newmodeus.com/shop/index.php?main_page=product_info&products_id=28 All pages—Product added Jun. 2007.*
PDF of http://support.dell.com/support/edocs/systems/plav/sm/remove.htm All pages—2001.*

* cited by examiner

Primary Examiner — Chun-Kuan Lee
Assistant Examiner — David Martinez

(57) ABSTRACT

An adapter for mounting a device in a computer enclosure is disclosed herein. A computer storage device adapter includes an adapter chassis configured to be installed in at least one drive bay of a computer, and to house a storage device. The adapter further includes a bezel attached to the chassis. The bezel has a color, texture, and relief pattern matching a color, texture, and relief pattern of a portion of a front panel of the computer directly adjacent to the at least one drive bay in which the adapter is to be installed.

19 Claims, 6 Drawing Sheets

COMPUTER STORAGE DEVICE ADAPTER FOR INSTALLING A STORAGE DEVICE IN A COMPUTER DRIVE BAY

BACKGROUND

Computer storage devices, such as hard drives, optical drives, etc., have been designed to have a variety of physical forms. For example, storage devices having 5.25 inch, 3.5 inch, or 2.5 inch widths are employed in various computer applications. Storage devices may also vary in height. For example, storage devices used in notebook computers may be of smaller height than similar storage devices used in desktop computers. Computers include storage device compartments (i.e., drive bays) for housing storage devices. The bays are generally configured to accommodate storage devices of a size most often used in that particular type of computer.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ."

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Computers often include one or more drive bays that are accessible from the front of the computer. Drive bays referred to as "half-height" bays are front accessible in many computers. A half-height bay is often intended to house a standard size (5.75"(W)×1.6"(H)) optical disk drive ("ODD"), such as a compact disk ("CD") drive, digital versatile disk ("DVD") drive, Blu-ray disk ("BD") drive, or other standard size storage device. It may be desirable to install in a computer drive bay, storage devices not intended for installation in the drive bay. For example, it may be desirable to install an optical disk drive ("ODD") sized for use in a notebook computer (i.e., a slim-line ODD) in a half-height drive bay. A slim-line ODD, for example, having dimensions of approximately 128 mm(width)×13 mm(height)×129 mm(depth) is not dimensioned for installation in a half-height drive bay. Embodiments of the adapter disclosed herein provide for conversion of one of more drive bays of a computer enclosure to house storage devices not sized for mounting in the drive bays. Embodiments of the adapter include a front plate ("bezel") that matches the computer front panel to provide enhanced aesthetics.

Figure 1:
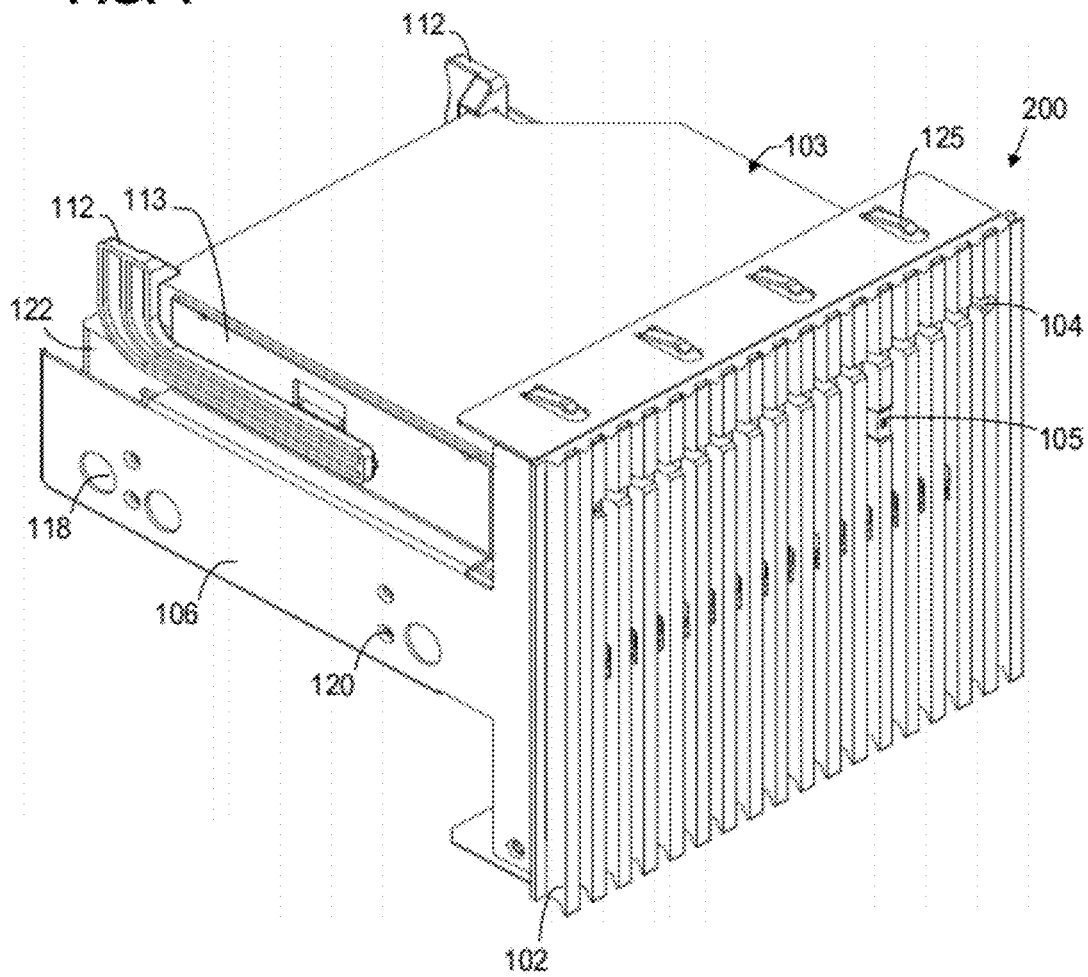
FIG. 1 shows a front isometric view of a computer storage device adapter configured to occupy three drive bays in accordance with various embodiments.

FIG. 1 shows a computer storage device adapter 100 configured to occupy three front accessible drive bays of a computer in accordance with various embodiments. Embodiments of the adapter 100 may be configured to occupy one or more drive bays of a computer system. The adapter 100 may be mounted in the drive bay(s) of the computer enclosure by various means. For example, screws, a latching mechanism, etc. may be used. Thus, some embodiments of the adapter 100 may include threaded holes 120 for receiving screws or retention pins. The adapter 100 includes a bezel 102 attached to the metallic chassis 106 of the adapter 100. The bezel 102 matches the appearance (e.g., color, texture, contour, relief pattern, etc.) of the portion of the front panel of the computer adjacent to where the adapter 100 is installed. Thus, the adapter 100 makes the computer more visually appealing than would a blank panel or standard drive bay mounted storage device, particularly if the computer includes a complex front panel design. The bezel 102 may be formed of plastic, metal, or any other material matching the appearance of the computer front panel into which the adapter 100 is installed.

The metallic chassis 106 of the adapter 100 may include contacts 125 configured to provide an electrical connection to the chassis of the computer in which the adapter 100 is installed. The contacts 125 provide for conduction of electromagnetic radiation absorbed by the metallic chassis 106. Thus, embodiments of the adapter 100 occupying multiple drive bays advantageously reduce the number of seams in the front panel of the computer thereby reducing computer induced electromagnetic interference ("EMI").

Embodiments of the adapter 100 are configured to house one or more storage devices (e.g., 103, 122). For example, the illustrated embodiment of the adapter 100 is configured to house a slim-line ODD 103 and a 3.5 inch hard drive. Embodiments can provide mounting for computer devices of various types, sizes and dimensions. For example, an embodiment may accommodate one or more 3.5 inch or 2.5 hard drives, a floppy drive, and/or an ODD or other computer related devices.

Embodiments of the adapter 100 provide various storage device mounting orientations. For example, some embodiments may provide for horizontal mounting of storage devices as shown in FIG. 1. Some embodiments may provide for vertical mounting of some storage devices mounted in the adapter 100. For example, the ODD 103 and hard drive 122 may be mounted vertically, or the ODD may be mounted horizontally and one or more 2.5 inch hard drives mounted vertically. Moreover, some embodiments allow storage devices mounted in the adapter 100 to span multiple drive bays of the computer when mounted in the adapter in any orientation thereby providing flexible positioning of devices within the drive bay space.

Some embodiments of the adapter 100 are configured to house a slim-line slot-loading ODD 103. The front bezel of the ODD drive 103 is positioned behind the adapter bezel 102 and is thus hidden from view. The bezel 102 includes a slot 104 through which optical media (e.g., a DVD, CD, etc.) may be inserted into or extracted from the ODD 103. Because the bezel of the ODD 103 is not accessible, a media eject switch provided on the bezel of the ODD 103 is not available for use. Embodiments of the adapter 100 include an eject button 105 located on the bezel 102 of the adapter 100. The terminals of the eject button 105 can be connected to terminals of the ODD 103 provided for remotely controlling media ejection. Thus, embodiments of the adapter 100 provide the eject button 105 in a convenient and easily accessible location of the bezel 102. Additionally, the location of eject button 105 can be standardized, whereas the location of an eject button on the bezel of the ODD 103 varies across ODDs. Consequently, embodiments of the adapter 100 are not limited to any particular ODD 103 based on the location of the ODD 103 eject button.

Figure 2:
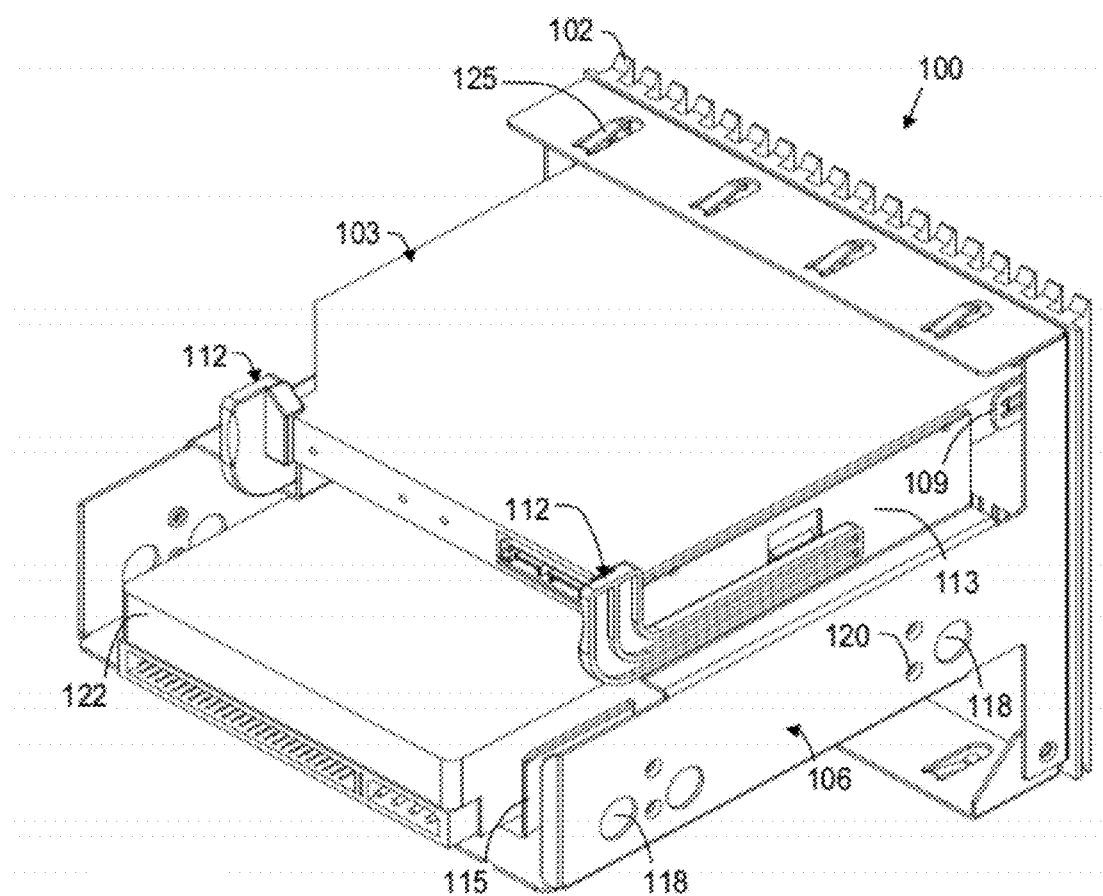
FIG. 2 shows a rear isometric view of a computer storage device adapter configured to occupy three drive bays in accordance with various embodiments.

FIG. 2 shows a rear isometric view of the computer storage device adapter 100. A slim-line ODD 103 and a hard drive 122 are shown mounted in the adapter 100. The slim-line ODD 103 can be mounted in the adapter 100 without mounting screws and without tools. In some embodiments, the hard drive 122 is mounted using screws that pass through mounting holes in the flange 124. Tool access to the screws is provided by way of tool access openings 118.

Figure 3:
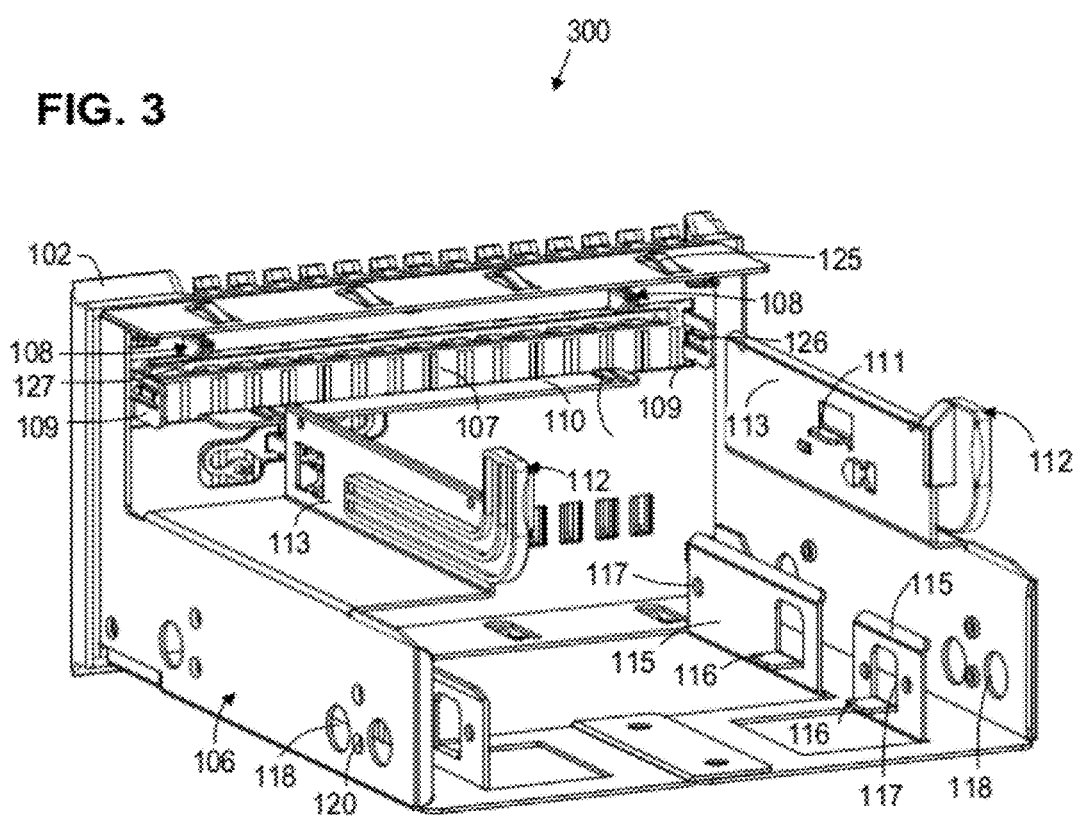
FIG. 3 shows a view of an empty storage device adapter in accordance with various embodiments.

FIG. 3 shows a rear isometric view of an empty adapter 300 in accordance with various embodiments. The adapter 300 is configured to occupy two drive bays of a computer enclosure and to house a slim-line slot-load ODD and a 3.5 hard drive. The adapter 300 includes flanges 115 for mounting a hard drive (e.g., 3.5 inch hard drive 122). The flanges 115 include support members 116 on which the hard drive 122 may rest. Embodiments provide mounting holes 117 for insertion of screws into the hard drive 122, and access holes 118 for tool entry. While mounting for a single hard drive 122 is shown as a matter of convenience, some embodiments provide mounting for multiple hard drives 122.

The various locating and retaining mechanisms provided by the adapter 300 for screwless mounting of the ODD 103 include, for example, the front wall 107 of the adapter chassis 106, upper front retainers 108, side front retainers 109, a lower front retainer 110, bottom side retainers 111, side walls 113, and rear flexible rear retainers 112 are shown. Some of the fixed retainers 108-113 may include contacts 126 configured to make an electrical connection with a metallic outer surface of the ODD 103 for EMI reduction purposes.

Figure 4A:
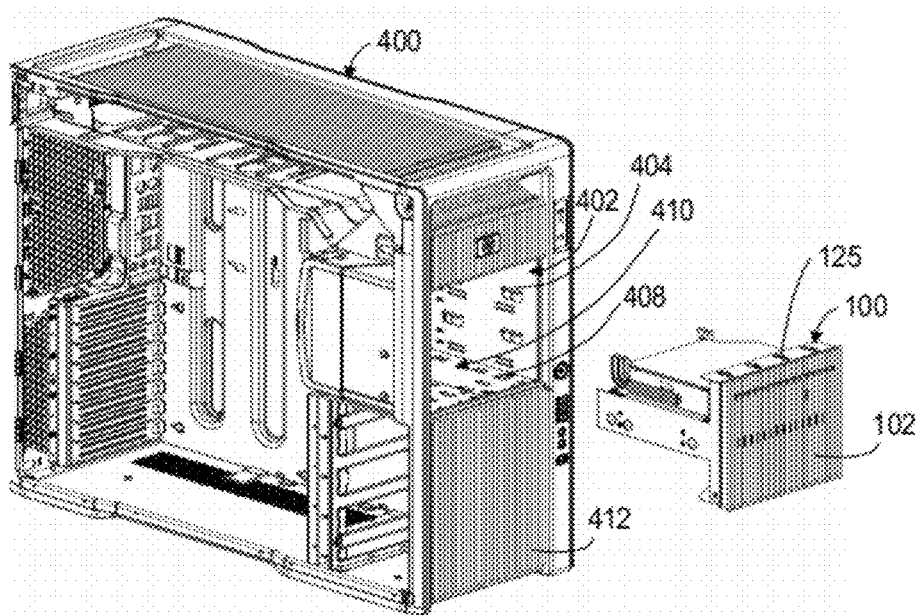
FIG. 4A shows a view of a storage device adapter being installed in a computer enclosure drive cage in accordance with various embodiments.

FIG. 4A shows the computer enclosure 400 with a multi-bay storage device adapter 100 being installed in the storage device cage 402. The storage device cage 402 is accessible from the front of the enclosure 400, and each bay of the cage may be configured to accommodate a standard size (approximately 5.75 inch width) ODD. The drive cage 402 includes flanges 404 that support standard size storage devices installed in the upper two drive bays. The cage 402 may be formed of a conductive material (e.g., aluminum, steel, etc.). The bottom inside surface 410 of the cage 402 may include contacts 408 that electrically connect the cage 402 to a device installed in the bottom drive bay of the cage 402.

Figure 5:
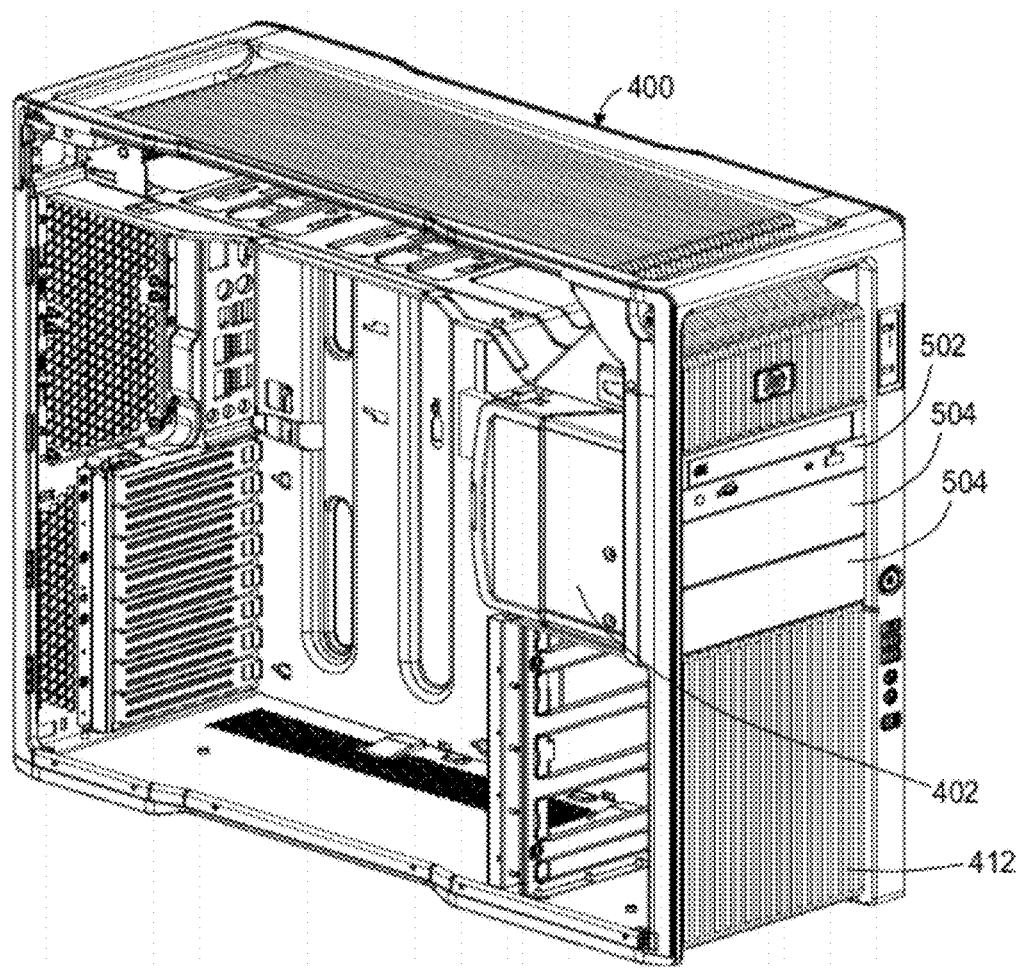
FIG. 5 shows a computer enclosure including a standard sized optical disk drive and blank fillers in the drive bays of the enclosure.

FIG. 5 shows the computer enclosure 402 including a standard size ODD 502 and blank fillers 504 installed in the three drive bays of the enclosure 400. The bezels of the ODD 502 and blank fillers 504 do not match the front panel 412 of the enclosure 400, and thus fail to enhance the visual aesthetics of the enclosure 400.

Returning to FIG. 4A, the front panel 412 of the computer enclosure 400 matches the bezel 102 of the storage device adapter 100. For example, the color, relief pattern, texture, finish, etc. of the front panel 412 and the adapter bezel 102 match thereby enhancing the appearance of the enclosure 400 when the adapter 102 is installed. In some embodiments, the bezel 102 of the adapter 100 is configured to at least match the areas of the front panel 412 adjacent to the bezel 102.

The storage device adapter installs in the cage 402 as a standard size storage device. The storage device adapter 100 may include contacts 125 for making an electrical connection with the cage 402 or an adjacent device. The multi-bay adapter 100 advantageously serves to reduce electromagnetic interference ("EMI") emitted from the enclosure 400 by reducing the number of seams in the front panel 412 of the enclosure 400.

Figure 4B:
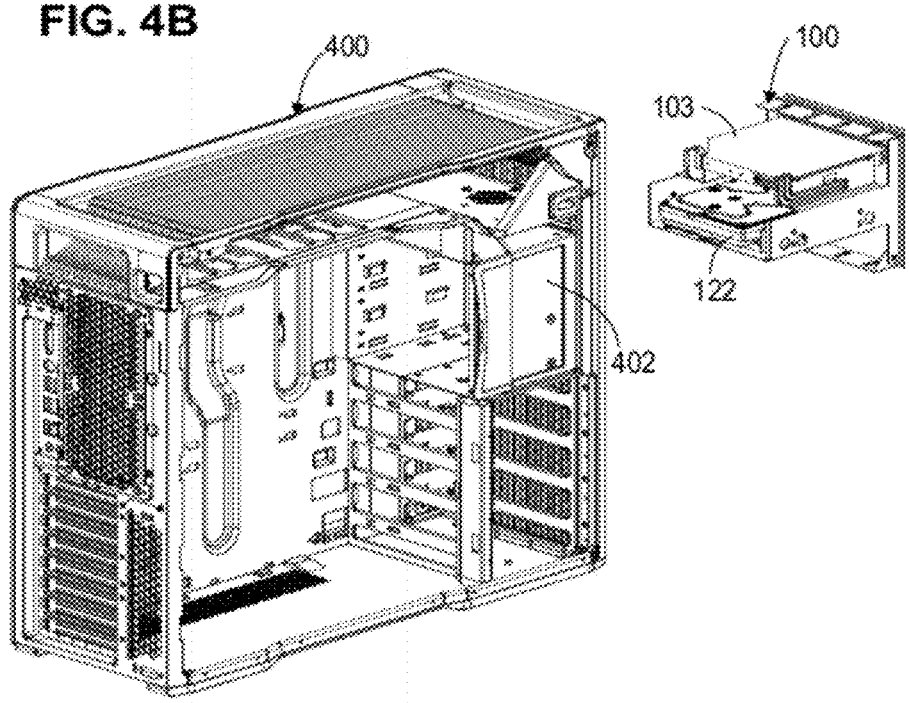
FIG. 4B shows another view of a storage device adapter being installed in a computer enclosure drive cage in accordance with various embodiments.

FIG. 4B shows another view of the computer enclosure 400 with the storage device adapter 100 being installed in the cage 402. As shown, the adapter 100 carries a 3.5 inch hard drive 122 and a slim-line ODD 103.

Figure 6:
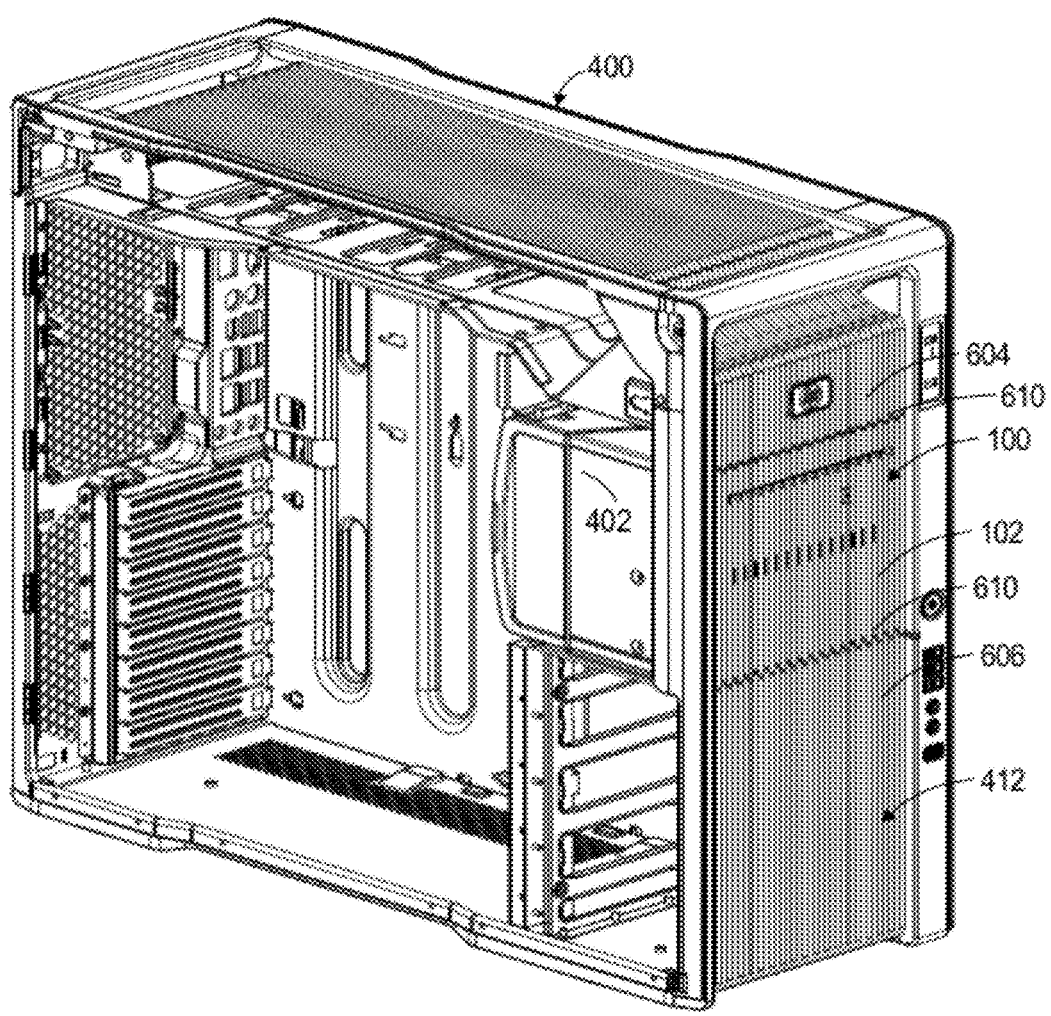
FIG. 6 shows a computer enclosure including an installed computer storage adapter in accordance with various embodiments.

FIG. 6 shows the computer enclosure 400 with the adapter 100 installed in the enclosure 400. The bezel 102 of the adapter 100 matches the directly adjacent portions 604, 606 of the front panel 402 of the computer enclosure 400. The adapter 100 improves the EMI performance of the enclosure 400 by reducing the number of seams 610 in the front of the enclosure 400.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer storage device adapter, comprising:
   an adapter chassis configured to be installed in at least one drive bay of a computer, and to house a storage device;
   a bezel, attached to the front of said chassis, comprising a color, texture, and relief pattern that matches a color, texture and relief pattern of a portion of a front panel of the computer directly adjacent to the at least one drive bay in which the adapter is to be installed;
   wherein the adapter is configured to occupy a plurality of drive bays of the computer.

2. The computer storage device adapter of claim 1, wherein the bezel, in conjunction with the front panel, is configured to simulate a unitary front panel of the computer.

3. The computer storage device adapter of claim 1, wherein the bezel further comprises a pushbutton configured to activate a function of the storage device.

4. The computer storage device adapter of claim 3, wherein the pushbutton is configured to activate a media eject function of an optical disk drive mounted in the adapter.

5. The computer storage device adapter of claim 1, wherein a slot in the bezel is configured to allow loading and unloading of storage media.

6. The computer storage device adapter of claim 1, wherein the storage device is concealed within the adapter.

7. The computer storage device adapter of claim 1, wherein the adapter includes an electrical contact configured to provide an electrical connection to the chassis of the computer.

8. The computer storage device adapter of claim 1, wherein the adapter is configured to concurrently mount a plurality of devices in the at least one drive bay, the plurality of devices not being dimensioned for installation in the at least one drive bay.

9. The computer storage device adapter of claim 1, wherein the adapter is configured to mount the computer storage device in a vertical orientation relative to the adapter.

10. The computer storage device of claim 1, wherein the storage device spans a plurality of device bays when mounted in the adapter.

11. The computer storage device adapter of claim 1, wherein the adapter is configured to house a slim-line optical disk drive and a hard drive.

12. The computer storage device adapter of claim 1, wherein the adapter is configured to house a plurality of storage devices and to present no more than two horizontal seams between the adapter and the front panel of the computer.

13. A computer system comprising:
a storage device adapter installed in at least one drive bay of an enclosure of the computer system, the storage device adapter configured to house a storage device;
wherein the storage device adapter is configured to concurrently house a plurality of storage devices not dimensioned for installation in the at least one drive bay;
wherein the at least one drive bay comprises horizontal flanges configured to support a storage device independently of the storage device adapter, and the storage device adapter is configured to engage the horizontal flanges.

14. The computer system of claim 13, wherein the storage device adapter comprises a bezel configured to match a color, texture, and relief pattern of portions of a front panel of the enclosure adjacent to the bezel.

15. The computer system of claim 14, further comprising a pushbutton disposed in the bezel of the adapter, the pushbutton configured to activate an operation of a storage device mounted in the adapter.

16. The computer system of claim 13, wherein the enclosure is electrically connected to the adapter via contacts disposed in one of a top plate and a bottom plate of the adapter.

17. The computer system of claim 13, further comprising an optical disk drive and a hard disk drive mounted in the adapter.

18. The computer system of claim 13, wherein the computer system comprises a plurality of drive bays occupied by the adapter.

19. The computer system of claim 13, wherein no more than two horizontal seams are present between the adapter bezel and a front panel of the enclosure.

* * * * *

UNITED STATES PATENT AND TRADEMARK OFFICE
CERTIFICATE OF CORRECTION

PATENT NO. : 8,244,942 B2  Page 1 of 1
APPLICATION NO. : 12/537014
DATED : August 14, 2012
INVENTOR(S) : Ronald P. Dean et al.

It is certified that error appears in the above-identified patent and that said Letters Patent is hereby corrected as shown below:

In column 5, line 11, in Claim 10, after "storage device" insert -- adapter --.

Signed and Sealed this
Twenty-sixth Day of February, 2013

Teresa Stanek Rea
*Acting Director of the United States Patent and Trademark Office*